March 1, 1932.  R. NEUHAUS  1,847,192
METHOD OF MAKING TANKS
Filed June 13, 1929
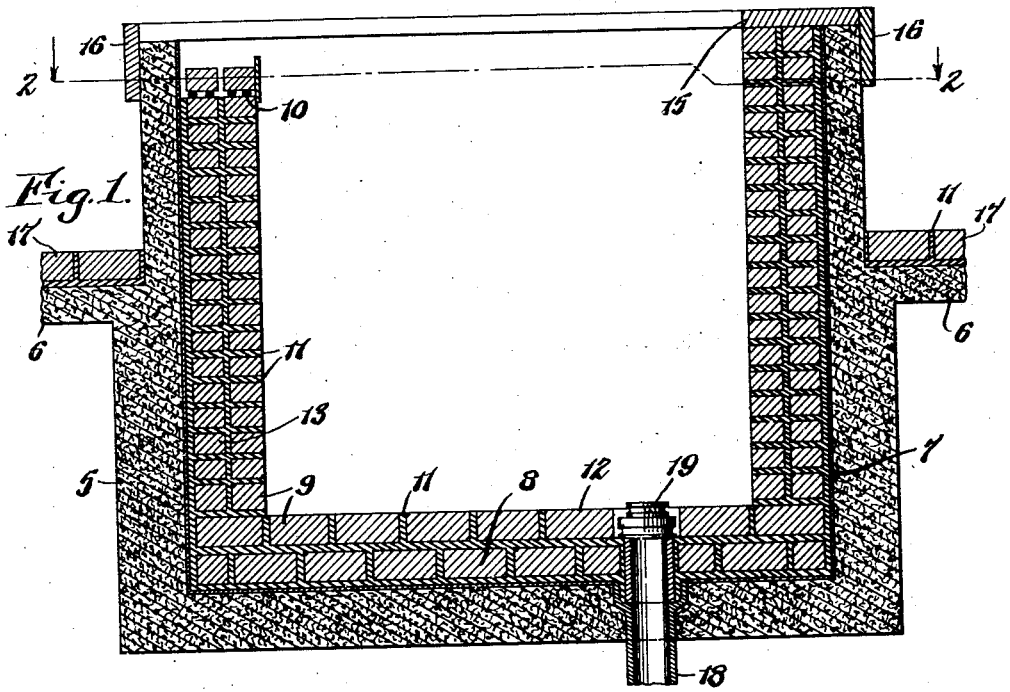
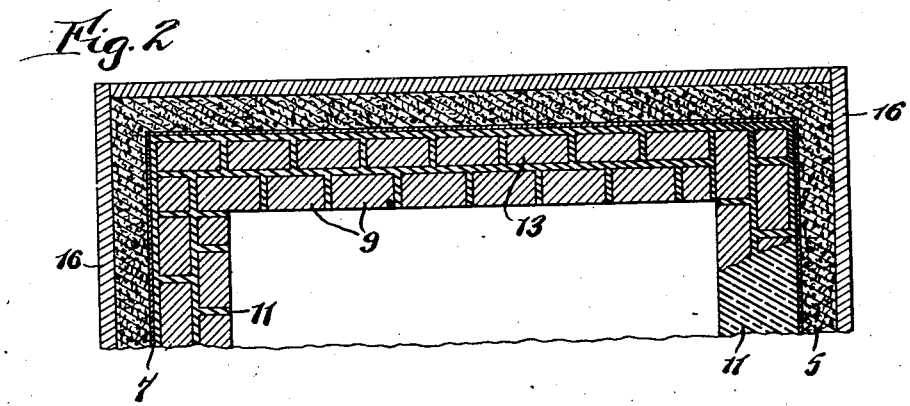
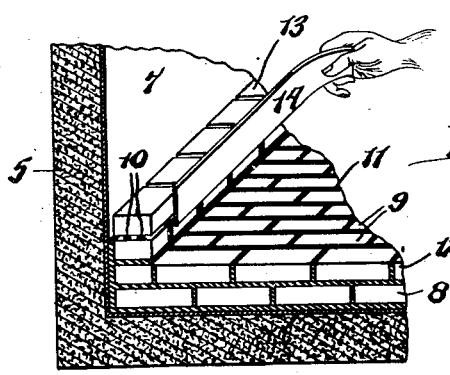
Inventor
Richard Neuhaus
By Page and Powers
Attorneys Patented Mar. 1, 1932

1,847,192

UNITED STATES PATENT OFFICE

RICHARD NEUHAUS, OF BUFFALO, NEW YORK, ASSIGNOR TO NUKEM PRODUCTS CORPORATION, OF BUFFALO, NEW YORK, A CORPORATION OF NEW YORK

METHOD OF MAKING TANKS

Application filed June 13, 1929. Serial No. 370,049.

This invention relates to a tank and method of making the same and more particularly to a tank for storing large quantities of acid or for use in pickling, plating and the like.

The principal object of this invention is to provide at a low cost a pickling, plating or storage tank which is entirely acid proof and is not subject to wear or deterioration through the storage of acids. With all forms of tanks now used for storing acids, such as wooden tanks, or lead lined tanks, within a comparatively short time the acids eat through the wood, or leaks develop at the seams of the lead lining and the tanks become leaky and unserviceable. With the present tank, the lining is entirely acid proof for concentrated and diluted, hot or cold sulfuric, hydrochloric, acetic and lactic acids and is immune to a 30% nitric acid solution, and will remain in good working condition indefinitely without developing any leaks.

Another aim is to provide such a tank which is easily built up and can be erected in a short time and when erected forms an integral structure which is entirely leak proof.

A further purpose is to provide such a tank which can be made in any desired shape or size thereby permitting it to be placed wherever convenient.

In the accompanying drawings:

Figure 1 is a vertical cross section of a tank made in accordance with the present invention.

Figure 2 is a fragmentary horizontal section taken on line 2—2, Fig. 1.

Figure 3 is a perspective view of a section of the tank illustrating one of the processes of its fabrication.

Similar characters of reference indicate like parts in the several figures of the drawings.

In its general organization, this invention comprises an outer shell made of concrete or any other suitable material and coated on its inner side with an acid proof asphalt cement having a high softening and melting point, and a lining composed of acid proof bricks supported and embedded in a hard setting acid proof sulfur cement which melts under heat and is applied in a molten state.

The shell 5 of the tank can be made of any suitable material and is shown as composed of concrete, the bottom part of the shell being shown as sunk below the concrete floor 6 of the building and the upper part rising above the floor.

After the concrete has set and hardened, all dust and loose particles are removed from the inside of the shell and the inside of the shell is coated with several coats 7 of asphalt cement. The asphalt cement used is preferably immune to acid and has a high softening and melting point and acts as a cushion and a binder for the lining. Each coat should be applied while hot and allowed to cool before applying the next coat. After applying the last coat the inside of the shell should be thoroughly inspected and any bare spot or blow hole should be marked and coated over with additional asphalt cement.

The tank is then lined with acid proof bricks which are set and embedded in a hard setting sulfur cement which is applied in a hot molten condition. A layer 8 of acid proof bricks or preferably paving blocks 9 is first arranged over the floor of the concrete shell 5, the blocks or bricks being arranged about one-quarter of an inch apart. Each of these bricks is supported by two or more flat hard pieces 10 of the sulfur cement, these hard pieces being approximately one quarter of an inch thick to space the layer of bricks from the bottom of the shell a corresponding distance. These pieces 10 are of the same material as the sulfur cement 11 which is subsequently poured in a molten state between the bricks to completely embed the same.

The molten sulfur cement is now poured between the bricks of the first layer 8, the sulfur cement being poured into the vertical joints until all the vertical joints are filled to the top. The molten sulfur cement will flow underneath the bricks enveloping five sides of each of the bricks.

Although various forms of sulfur cement can be employed, it is preferable to employ a sulfur compound of high tensile strength and having a melting temperature of not less than 230° F., for example, sulfur and slate, sulfur and glass, or sulfur and clay in the proportions of about 60% of sulfur to about 40% of slate, glass or clay, as the case may be. Such sulfur cement is absolutely immune to concentrated or diluted, hot or cold sulfuric, hydrochloric, acetic and lactic acids and is immune to a 30% nitric acid solution. It is also immune to all atmospheric conditions.

It is normally in a solid form and is easily liquified by heating in a pot or kettle over a slow fire to about 250° F. At temperatures above 320° F. this sulfur cement becomes pasty but liquefies upon reduction of the temperature. It hardens a few minutes after application.

After the bottom layer of bricks has been poured and the sulfur cement has set, it is followed by a second or upper layer 12 of bricks. The bricks of the second layer are embedded in the same manner as those of the first layer 8, each brick being set upon two or more pieces 10 of the hard sulfur cement and the molten sulfur cement being subsequently poured in the vertical joints between the bricks so as to flow under each brick and under the sides thereof and completely embed the same.

The side lining 13 of the tank is then built up of the bricks or blocks 9, the bricks in comparatively shallow tanks of three feet depth or less being lined with the sides of the bricks against the concrete shell 5 as shown and higher tanks being lined with the ends of the bricks against the wall. The lining is built up layer by layer, each brick of each layer being supported by two or more flat pieces of the hard sulfur cement 10 as in making the floor layers, and each brick is set away from the coated wall of the tank. After a layer of bricks of one or more bricks in thickness has been so placed, a strip of paper 14 is glued to the side of the layer so as to cover all the joints. Ground glue should be used and it should be allowed to dry a few minutes before the joints are filled with the molten sulfur cement, which latter flows under and around the bricks enveloping them on four sides. The next succeeding layer is fabricated the same way and the successive layers of bricks are embedded in place until the top of the tank is reached.

The tank should then be allowed to cool off from ten to fifteen hours after which it can be filled with hot water to loosen and remove the paper strips from the side lining. The tank can then be completed by placing boards 15 at the top of the walls of the tank and side boards 16 around the sides. To prevent spilled acid from injuring the floor 6 around the tank, this floor can also be covered with a layer 17 of bricks which are set in the sulfur cement in the same manner as the bricks at the bottom of the tank. It is also apparent that drains or conduits can be set into the bottom or sides of the tank, such as the drain 18 which is closed by a drop valve 19.

This invention provides an acid tank and method of making the same which is inexpensive, easy to fabricate, and when complete is entirely leak proof and free from wear and tear and deterioration from the acids it is designed to hold and will function indefinitely. The lining and the shell of the tank are also cemented to form an integral tank which is strong and durable in its construction.

I claim as my invention:

1. A method of lining a tank having an outer shell which consists in supporting at least one layer of bricks on the floor of said shell on hard pieces of sulfur cement, pouring molten sulfur cement in the joints between the bricks, supporting at least one layer of bricks along the sides of said shell on hard pieces of sulfur cement, applying an adhesive strip along the sides of said side layer and over the joints at the side of said side layer and pouring molten sulfur cement in the vertical joints between the bricks of said side layer.

2. A method of lining a tank having an outer shell which consists in first coating the inside walls and floor of the shell with a layer of asphalt cement, arranging a layer of spaced bricks or the like over the coated floor of the shell, pouring a hard setting acid proof cement in the vertical joints between the bricks and building up the walls of the lining by laying bricks or the like layer by layer in spaced relation to said coating layer of asphalt cement on said walls and by pouring a hard setting acid proof cement between said wall bricks and between said wall bricks and the said coating layer of asphalt cement on said walls.

3. A method of lining a tank having an outer shell which consists in first coating the inside walls and floor of the shell with hot molten asphalt cement, permitting said layer of asphalt cement to cool and harden, arranging a layer of bricks or the like over the layer of asphalt cement on the floor of said shell and in spaced relation thereto, pouring molten sulfur cement having a melting temperature of not less than 230° F. in the vertical joints between said bricks and the layer of asphalt cement on said floor and building up the walls of the lining from said floor by laying bricks or the like layer by layer in spaced relation to said coating layer of asphalt cement on said walls and by pouring said molten sulfur cement between said wall bricks and between said wall bricks and the said coating layer of said asphalt cement on said walls.

4. A method of lining a tank having an outer shell which consists in arranging at least one layer of bricks above the floor of said shell and in spaced relation thereto, pouring molten sulfur cement in the joints between the bricks, building up the walls of said lining by laying bricks or the like layer by layer in spaced relation to one another and to the sides of said shell, applying an adhesive strip along the inner sides of said side bricks and over the joints between said side bricks and pouring molten sulfur cement in the vertical joints between said side bricks.

5. A method of lining a tank having an outer shell which consists in supporting a layer of bricks on the floor of said shell and in spaced relation thereto, pouring molten sulfur cement in the joints between said bricks, building up the walls of the lining by laying bricks or the like layer by layer in spaced relation to one another and to the walls of said shell, arranging a form against the inside faces of said bricks and over the joints therebetween, and pouring molten sulfur cement in the vertical joints between said side bricks.

In testimony whereof I hereby affix my signature.

RICHARD NEUHAUS.